United States Patent
Boyle, III et al.

(10) Patent No.: US 7,445,237 B2
(45) Date of Patent: Nov. 4, 2008

(54) AIR BAG VENT

(75) Inventors: Walter J. Boyle, III, Lake Orion, MI (US); Bijal Patel, Novi, MI (US)

(73) Assignee: Chrysler LLC, Auburn Hills, MI (US)

( * ) Notice: Subject to any disclaimer, the term of this patent is extended or adjusted under 35 U.S.C. 154(b) by 1 day.

(21) Appl. No.: 11/536,185

(22) Filed: Sep. 28, 2006

(65) Prior Publication Data

US 2008/0079250 A1 Apr. 3, 2008

(51) Int. Cl.
*B60R 21/239* (2006.01)

(52) U.S. Cl. ..................... 280/739; 280/743.1

(58) Field of Classification Search .............. 280/742, 280/736, 743.1, 739
See application file for complete search history.

(56) References Cited

U.S. PATENT DOCUMENTS

| 5,405,166 | A | * | 4/1995 | Rogerson | .................... 280/739 |
| 5,560,649 | A | * | 10/1996 | Saderholm et al. | ........ 280/743.1 |
| 5,853,191 | A | * | 12/1998 | Lachat | .................... 280/730.2 |
| 6,676,158 | B2 | | 1/2004 | Ishikawa | |
| 6,991,258 | B2 | * | 1/2006 | Hawthorn et al. | ............ 280/742 |
| 7,264,268 | B2 | * | 9/2007 | Ehrke | ......................... 280/729 |
| 2004/0012180 | A1 | * | 1/2004 | Hawthorn et al. | ............ 280/739 |
| 2004/0150200 | A1 | * | 8/2004 | Yamada et al. | ............... 280/732 |
| 2006/0125215 | A1 | | 6/2006 | Clarke et al. | |
| 2006/0125219 | A1 | | 6/2006 | Kokeguchi et al. | |
| 2006/0181067 | A1 | * | 8/2006 | Maripudi | ..................... 280/736 |

\* cited by examiner

*Primary Examiner*—Eric Culbreth
(74) *Attorney, Agent, or Firm*—Ralph E. Smith

(57) ABSTRACT

An air bag includes a wall defining an interior in which a gas is received to inflate the air bag, and at least one vent opening through the wall and a vent valve carried by the wall. The vent valve has at least one valve opening, and the vent valve is moveable between a first position where the valve opening is aligned with at least one vent opening and a second position where the valve opening is at least partially misaligned with at least one vent opening to at least partially close the vent opening. The vent valve is in its first position until deployment of the air bag beyond a threshold which moves the vent valve to its second position.

12 Claims, 4 Drawing Sheets

AIR BAG VENT

FIELD OF THE INVENTION

This invention relates generally to vehicle safety devices and more particularly to an air bag.

BACKGROUND OF THE INVENTION

Many current passenger vehicles are equipped with air bags that deploy in certain vehicle impact events. Air bag deployment usually involves relatively rapid inflation of the air bag with a gas. The inflation rate and force may be controlled in commercial passenger vehicle applications to meet various governmental regulations. Some governmental regulations relate to, for example, limiting injuries to an occupant of a child seat resulting from an air bag impacting the child seat or occupant of the child seat. Some vehicles meet such governmental regulations by providing relatively complex and expensive sensor systems that disable the air bag unless a passenger above a threshold weight is detected in a seat adjacent to the air bag.

SUMMARY OF THE INVENTION

An air bag includes a wall defining an interior in which a gas is received to inflate the air bag, and at least one vent opening through the wall, and a vent valve. The vent valve has at least one valve opening, and the vent valve is moveable between a first position where the valve opening is aligned with at least one vent opening and a second position where the valve opening is at least partially misaligned with at least one vent opening to at least partially close the vent opening. The vent valve is in its first position until deployment of the air bag beyond a threshold which moves the vent valve to its second position.

Accordingly, if the air bag encounters an obstruction during initial deployment, increased venting of the air bag is permitted through the aligned valve and vent opening(s). This may reduce the force (or energy) that the air bag imparts to the obstruction (e.g. a child seat and/or occupant). Deployment of the air bag beyond the threshold at least partially closes the vent opening(s) to at least partially reduce the open vent area of the air bag. In one implementation, the valve substantially or entirely closes all the vent openings with which it is associated. The active air bag vent valve may be in the open state initially and therefore may provide a softer interaction with the obstruction since the obstruction is typically in the deployment zone of an inflating air bag. In an unobstructed deployment, such as in the case of a normally seated (in-position) occupant, the occupant to air bag interaction may occur at a time when the vent valve is likely closed or substantially so, and the air bag may act as a conventional air bag system that does not have an active venting system.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

Figure 1:
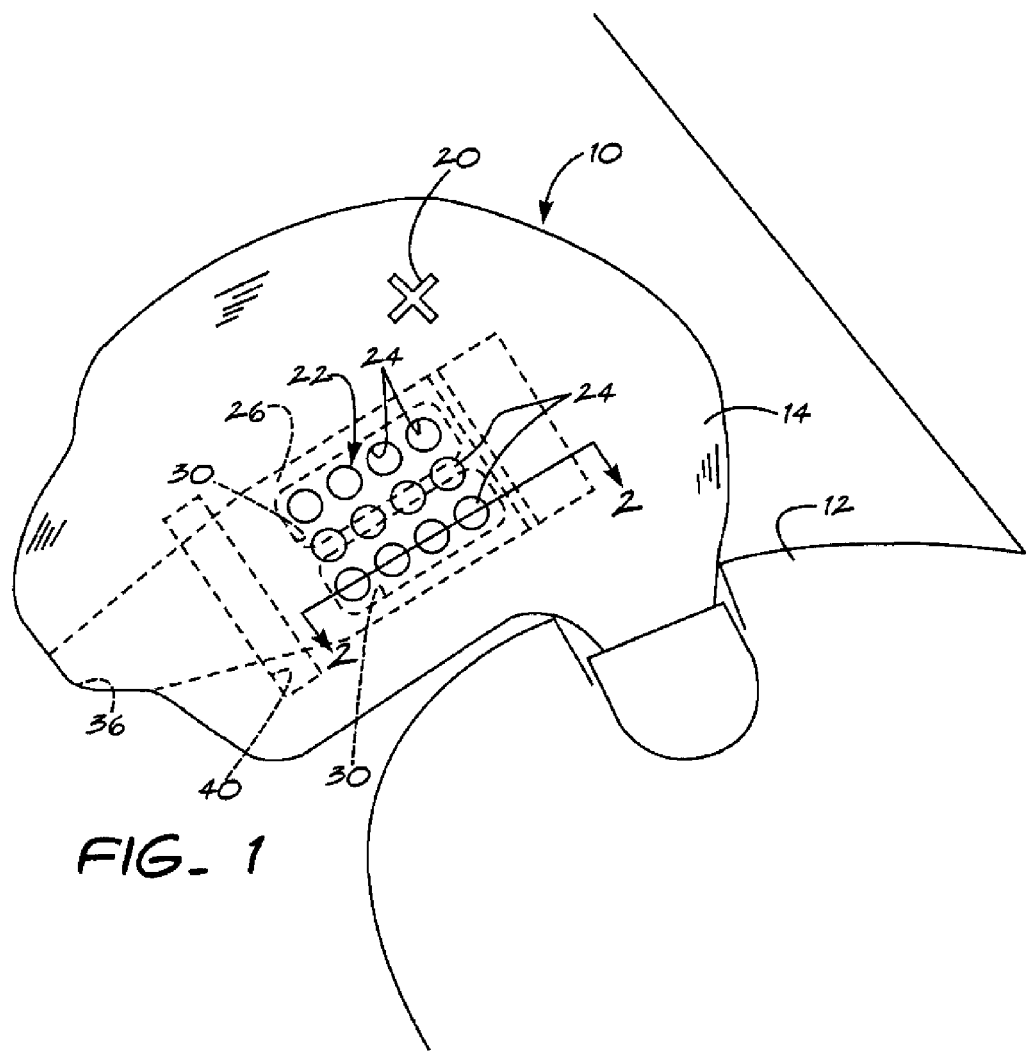
FIG. 1 is a side view of one implementation of an air bag having a vent valve in its open position.
Figure 2:
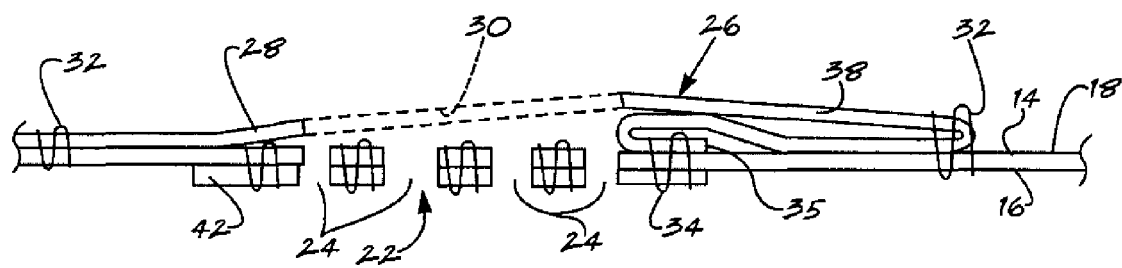
FIG. 2 is sectional view of a portion of the air bag taken generally along line 2-2 in FIG. 1.
Figure 3:
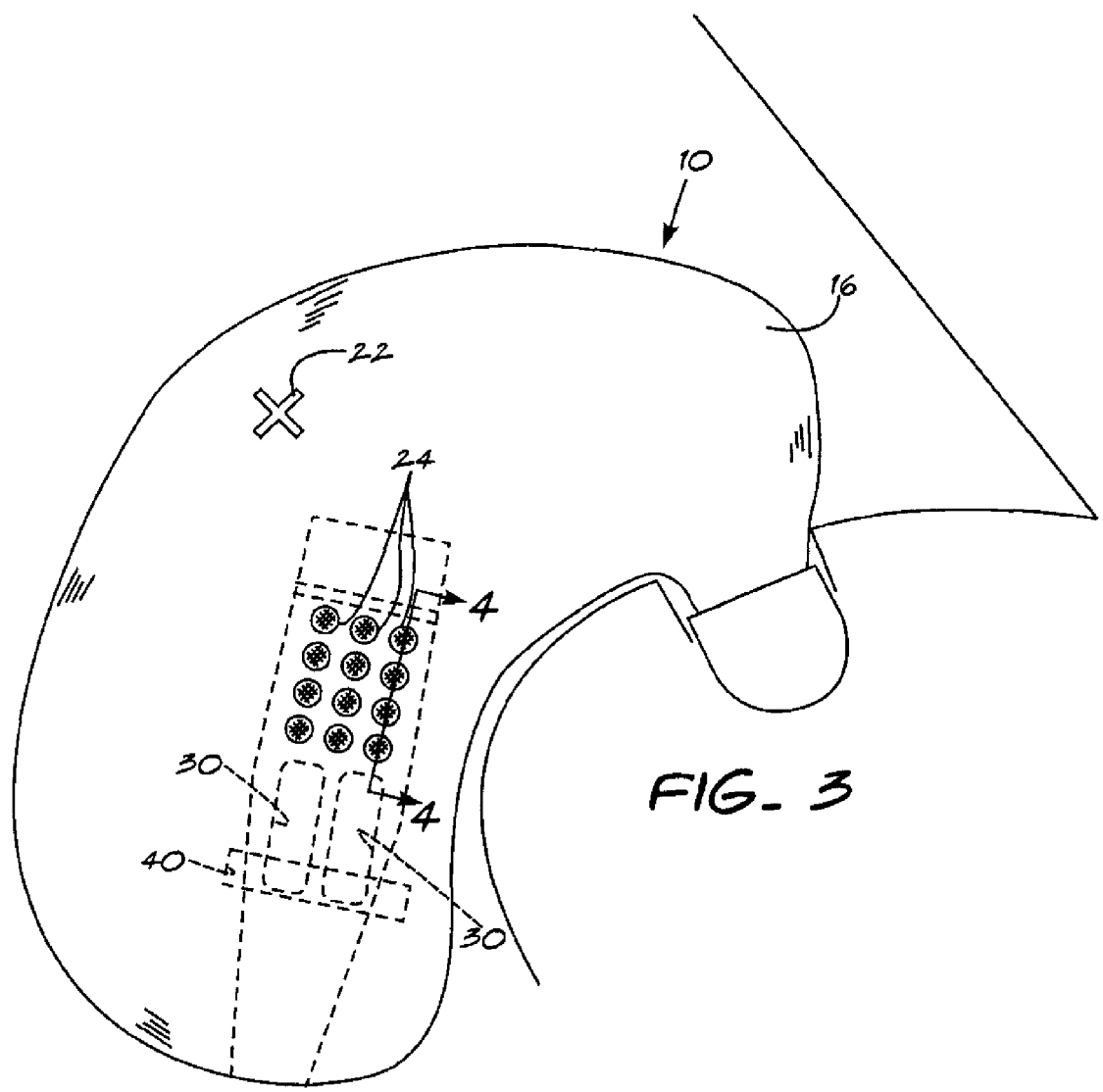
FIG. 3 is a side view showing the vent valve in its closed position.

Referring in more detail to the drawings, FIGS. 1-4 illustrate one implementation of an air bag 10 that may be used, for example, in a passenger vehicle. The air bag 10 may be located anywhere in the interior of the vehicle, such as in a dashboard 12 if the airbag 10 is used for a passenger seated next to the driver of the vehicle. Of course, other locations may be used, as desired. As the air bag 10 is deployed, as shown in FIGS. 1 and 3, the air bag is filled with a gas and expands into the passenger compartment of the vehicle. The air bag 10 may be engaged by a passenger in the vehicle, as is known in the art. The term passenger may include any vehicle occupant including passengers in or out of child restraint seats, the driver, animals, etc.

The air bag 10 may be formed of conventional materials, and in a conventional manner and a conventional shape, as desired for a particular application. The air bag may include one or more panels or sheets of material defining a wall 14 having an exterior 16 that may be engaged by a passenger, and an interior 18 that at least partially contains the gas during deployment. The air bag 10 may include one or more unobstructed vents 20 formed through the air bag wall 14 that facilitate a controlled vent rate of the gas expanding the air bag during a deployment. The vent 20 shown in FIGS. 1 and 3 is generally X-shaped. None, or one or more vents of any shape, size or location may be used.

Instead of or in addition to the unobstructed vent or vents 20, one or more at least partially selectively closed vents 22 may also be provided. As shown in FIGS. 1 and 2, the vent 22 may include one or more vent openings 24 formed through the air bag wall 14, and a vent valve 26 arranged to selectively close at least a portion of the open area to at least reduce, and in some applications severely restrict, gas flow through the vent valve during at least a portion of the air bag deployment. In the implementation shown, a plurality of vent openings 24 are provided in the air bag 10, and the vent valve 26 includes a valve panel 28 that includes one or more valve openings 30 therethrough and is folded onto itself and releasably retained in an open or first position, with its valve opening(s) 30 aligned or at least partially registered with the vent openings 24. In one form, twenty-four vent openings 24 are provided in two spaced apart sets of twelve openings per set (only one set is shown in the drawings), each vent opening being about 21.5 mm in diameter. This provides a vent area of about 4,350 mm$^2$ per set, although the vent area could be reduced by, for example, up to 70% or more or increased by, for example, up to 100% or more, as desired for a particular application.

In the implementation shown in the drawings, the valve panel 28 may be formed from the same or a similar material as the air bag wall 14, and the valve panel 28 may be releasably retained by tack stitches 32 connecting the valve panel to the air bag wall 14. The valve panel 28 may also be tethered or permanently connected to the air bag at desired locations, such as by stitches 34 or other attachment along or at each of a pair of opposed ends 35, 36 of the valve panel. Of course, the valve panel 28 may be formed of any suitable material or substance, and it may be connected to the air bag wall 14 by any suitable means, including stitches, staples, ties, button, snap, adhesive, hook and loop fastener, or the like.

Figure 6:
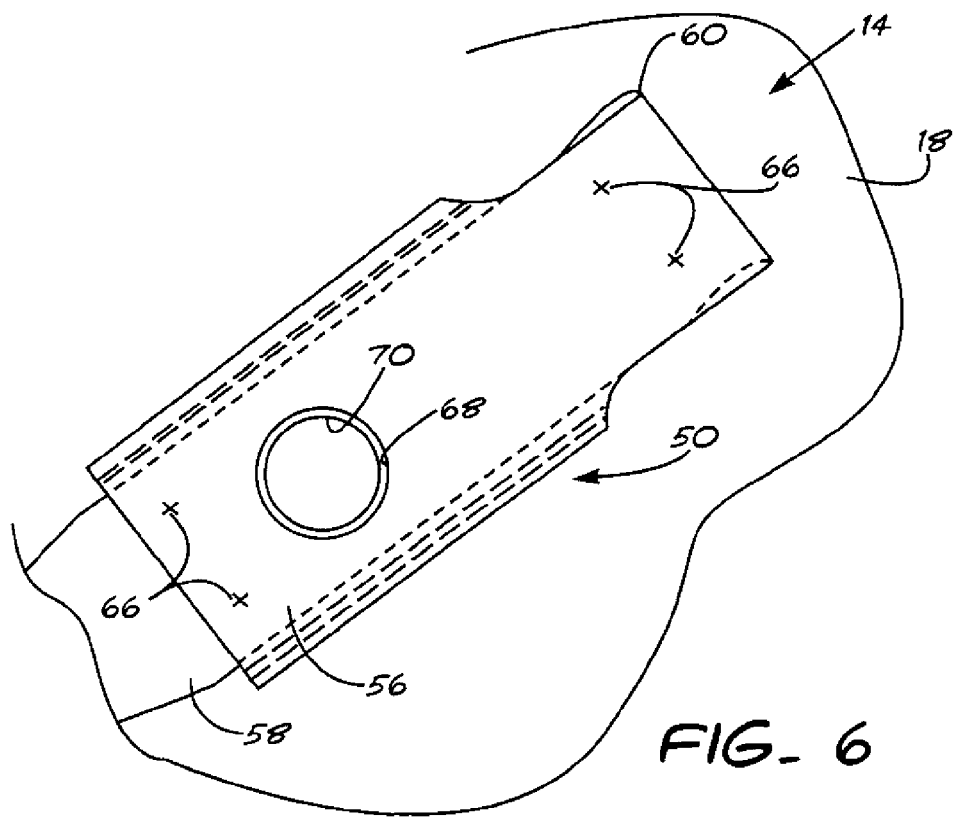
FIG. 6 is a fragmentary view of the vent valve in its open position.

Slack or folds may be provided between the ends 35, 36 of the valve panel 28 when the air bag 10 is stored and prior to deployment. As the air bag 10 is deployed, the distance between the ends 35, 36 of the valve panel 28 increases. Initial deployment of the air bag 10, up to the threshold, straightens out or removes the slack from the valve panel 28 but preferably does not move the valve opening(s) 30 relative to the vent opening(s) 24. When the slack or folds are taken up, further deployment of the air bag 10, beyond the threshold, moves the valve opening(s) 30 relative to the vent opening(s) 24 and at least partially closes the vent opening(s) 24. As best shown in FIG. 2, the valve panel 28 may be accordion folded providing at least one pleat 38 that may be releasably connected to the air bag wall 14 by one or more tack stitches 32. The tack stitches 32, or other suitable means of temporarily holding the vent valve in position (such as, frangible fabric joint, etc), are designed to stay in place and intact until the air bag 10 is deployed beyond a threshold amount wherein the valve panel is placed in tension and thereafter breaks or pulls out the tack stitches 32 to release the accordion fold and permit the valve panel 28 to at least partially cover the vent openings. In the embodiment illustrated in FIG. 6, tack stitches 66 each hold a force of between about 10 to 60 newtons, and between 2 and 8 tack stitches 66 are provided.

Figure 4:
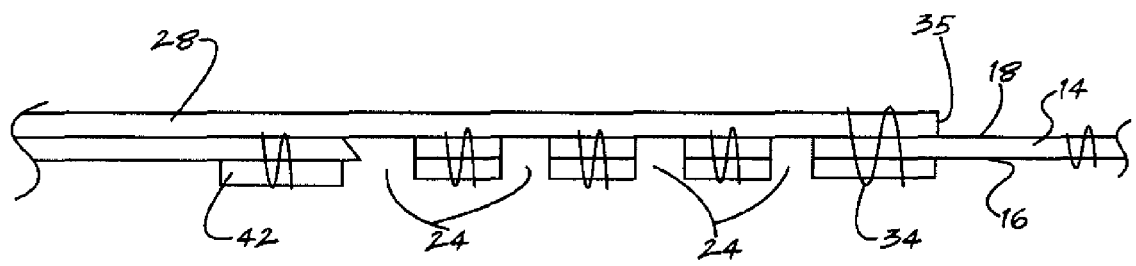
FIG. 4 is a sectional view of a portion of the air bag taken generally along line 4-4 in FIG. 3.
Figure 5:
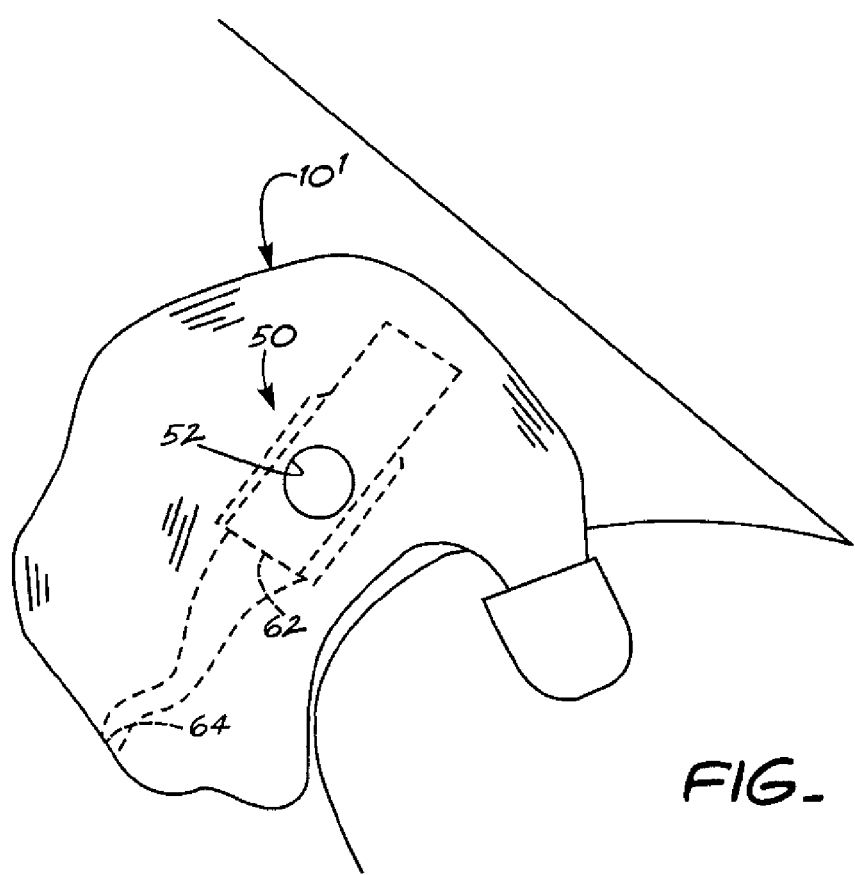
FIG. 5 is a side view of an air bag having an alternate vent valve shown in its open position.

Accordingly, the valve panel 28 may be constructed and arranged in such a manner that when the air bag 10 is folded and stored, and until the air bag is deployed beyond a threshold amount, the valve panel 28 does not restrict gas flow through the vent openings 24. Hence, upon initial deployment of the air bag 10 up to a threshold amount of deployment, the vent openings 24 and the unobstructed vents 20, if any, permit controlled venting of the gas out of the air bag interior. After the threshold amount of deployment, the releasable connection between the valve panel 28 and the air bag 10 releases. Continued air bag deployment increasingly unfolds the valve panel 28 so that its valve openings 30 are increasingly moved relative to and out of registry with the vent openings 24 and the valve panel 28 covers at least part of at least some of the vent openings 24 to restrict or prevent gas flow out of the air bag interior through the vent openings. As shown in FIGS. 3 and 4, when the valve panel 28 completely unfolds, it may completely cover all the vent openings 24. In other words, when fully unfolded, the valve openings 30 in the valve panel 28 may be moved out of registry with the vent openings 24 such that the material of the valve panel 28 overlies and closes the vent openings 24. Of course, the valve panel 28 may be designed so that it does not completely close all of the vent openings 24, or any of the vent openings 24. For example, the valve panel 28 may be arranged so that its openings 30 are not moved completely out of registry with the vent openings 24, or the valve panel may have separate and smaller openings that are moved into registry with the vent openings when the valve panel is unfolded, to permit some venting through one or all of the vent openings even when the valve panel is fully unfolded. This may be done, for example, to provide controlled venting of the air bag 10 in addition to, or instead of, any unobstructed vents.

When unfolded, the valve panel material is forced by the pressurized gas in the air bag interior against the interior surface 18 of the air bag wall 14 so that it covers and closes the vent openings 24. To reduce extrusion of the valve panel 28 through the vent openings 24 under force of the pressurized gas, a plurality of smaller vent openings 24 may be provided, and the length of the valve panel 28 can be selected so that the valve panel 28 is relatively taut and fully unfolded when the air bag 10 is fully deployed. The width of the valve panel 28 may also be greater than the width of the vent opening or vent openings 24 so that even if some extrusion of the valve panel 28 through or into the vent openings occurs, the valve panel 28 still covers and closes the vent openings to the extent desired.

To guide the unfolding of the valve panel 28, and hold the valve panel generally adjacent to the air bag interior surface 18, a guide strip 40 may be provided. This may provide more efficient and repeatable unfolding of the valve panel 28 and closing of the vent openings 24. The guide strip 40 may span the valve panel 28 and be connected to the air bag wall 14 to permit sliding movement of the valve panel 28 between the guide strip 40 and the air bag interior surface 18. Further, to prevent the air bag 10 from tearing in the area of the vent openings 24 and/or to maintain the shape of the vent openings 24, a reinforcing panel 42 may be connected to the air bag wall 14, as best shown in FIGS. 2 and 4.

Another arrangement of a vent valve 50 in an air bag 10' is shown in FIGS. 5-8. This vent valve 50 includes a single vent opening 52 (although more could be used) and a valve panel 54 adapted to selectively close the vent opening 52 after air bag deployment beyond a threshold. The valve panel 54 may be folded over a portion of itself providing a pair of legs 56, 58 and a bight 60. The valve panel 54 may be more securely or permanently connected to the air bag wall 14 adjacent the ends 62, 64 of each leg 56, 58 with a portion of one leg 58 received between the interior 18 of the air bag wall 14 and the other leg 56. The leg 56 may be connected to the air bag wall 14, such as by stitches 65, along edges that extend outwardly beyond the leg 58. The valve panel 54 may be temporarily or releasably connected between the ends 62, 64 of its legs 56, 58 to the air bag wall 14 or to itself, such as by tack stitches 66 designed to break or pull apart when the valve panel 54 becomes extended during air bag deployment beyond a threshold. The valve panel 54 includes a pair of valve openings 68, 70 that are formed one in each leg 56, 58, respectively, and are aligned with each other, and also with the vent opening 52 through the air bag wall 14 in a first position of the vent valve. The releasable connection helps maintain the vent valve 50 in this first position during storage and initial deployment. In this position, gas in the interior of the air bag 10' may vent relatively rapidly through the aligned valve and vent openings 52, 68, 70.

Figure 7:
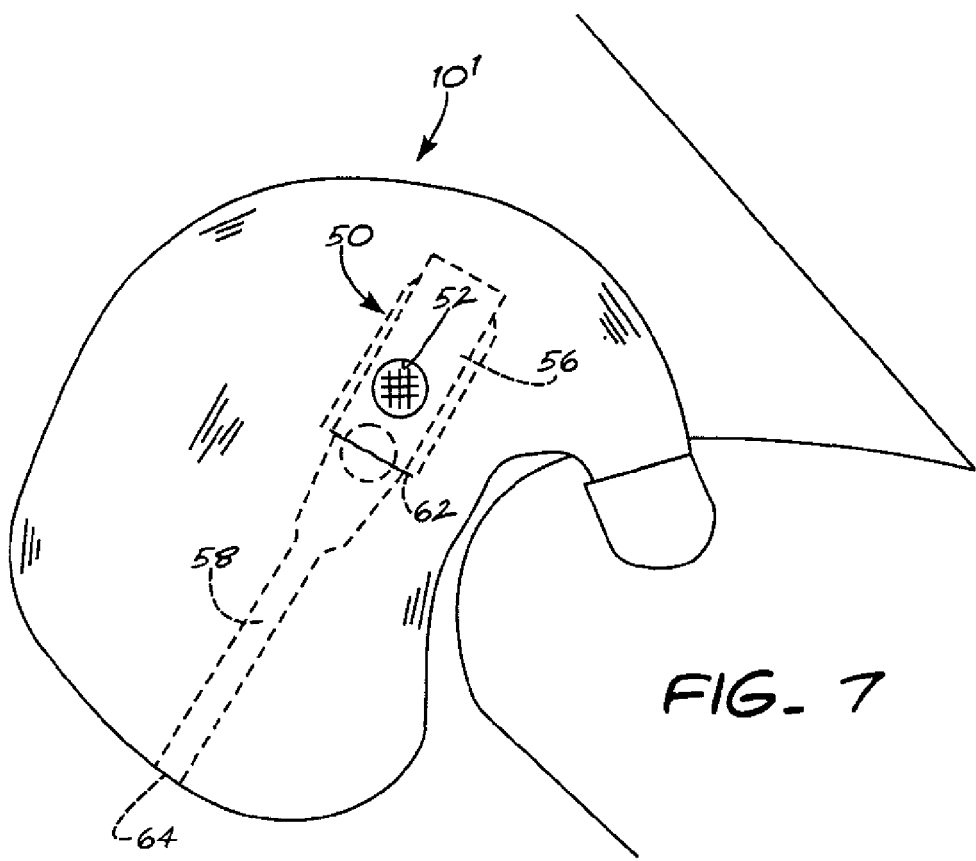
FIG. 7 is a side view of the air bag of FIG. 5 showing the vent valve in its closed position.
Figure 8:
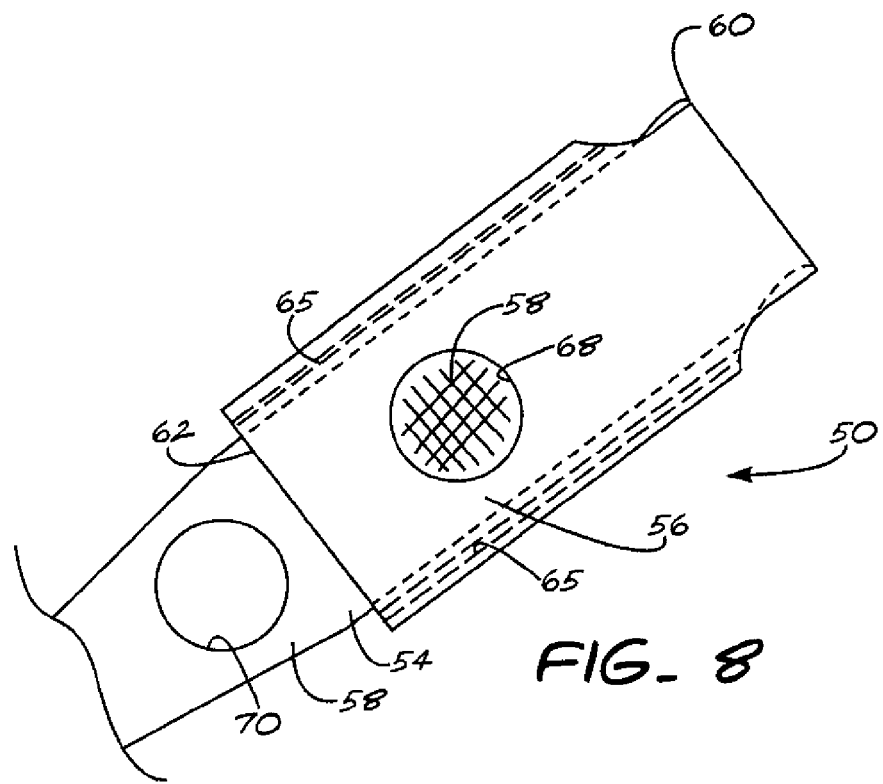
FIG. 8 is a fragmentary view of the vent valve in its closed position.

As best shown in FIGS. 7 and 8, after air bag deployment beyond a threshold, one leg 58 of the valve panel 54 is pulled or extended which increases its length and decreases the length of the other leg 56. This moves the valve opening 70 in the extended leg 58 relative to both the valve opening 68 of the other leg 56 and the vent opening 52 so that the vent opening is at least partially blocked by material from the extended leg 58 of the valve panel 54. In this implementation, the valve opening 68 through the leg 56 remains aligned with the vent opening 52, and both are covered and hence, closed, by the material of the extended leg 58, although other arrangements may be utilized.

In this manner, upon initial deployment of the air bag 10, 10', an increased area of vent openings 24, 52 is provided. Should a deploying air bag encounter an obstruction, such as a child seat, before being deployed the threshold amount, the vent openings 24, 52 will remain at least partially open permitting increased venting of the air bag 10, 10' and reducing the impact force of the air bag on the obstruction. This may permit the air bag 10, 10' to pass various low risk deployment regulations, such as those currently required for 1, 3 and 6-year old passengers. After air bag deployment beyond a threshold, the open vent area is reduced, and at least in the area of the vent valve 26,50, the vent openings may be substantially or entirely covered. This prevents undesired loss of pressure within the air bag so the air bag can interact with a passenger, such as a seated adult. In the example where the vent opening(s) are totally covered, some venting may still occur by way of permeation through the material covering the vent openings 24,52.

Various parameters can affect the threshold deployment needed to move the vent valve to its second position. Among these are the length of the valve panel, the angle at which it is connected to the air bag compared to the angle at which that section of the air bag moves during deployment, the amount of slack or folding of the valve panel, and the like.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. An air bag, comprising:
    a wall defining an interior in which a gas is received to inflate the air bag, and at least one vent opening through the wall; and
    a vent valve carried by the wall and having a valve panel including at least one valve opening, the vent valve being moveable between a first position where the at least one valve opening is in registration with the at least one vent opening and a second position where the at least one valve opening is at least partially misaligned with the at least one vent opening to at least partially close the at least one vent opening, and wherein the vent valve is in its first position until deployment of the air bag beyond a threshold which moves the vent valve to its second position;
    wherein the valve panel is folded within the interior of the air bag when the vent valve is in its first position, and movement of the air bag when deployed beyond the threshold at least partially unfolds the valve panel to move the vent valve to its second position;
    wherein the valve panel folded onto itself provides a first leg and a second leg with a bight between them, the first leg and second leg each being connected to the wall, and at least one of the first and second legs including the at least one valve opening that is aligned with the at least one vent opening when the vent valve is in its first position, and wherein the valve panel is extended and increasingly unfolds when the air bag is deployed beyond the threshold to lengthen the second leg and shorten the first leg so that the at least one valve opening is moved relative to and at least partially out of registry with the at least one vent opening, which reduces extrusion of the valve panel therethrough under force of pressurized gas.

2. The air bag of claim 1 wherein the vent valve is releasably connected to the air bag in its first position to maintain the vent valve in its first position until the air bag has deployed beyond the threshold.

3. The air bag of claim 2 wherein the vent valve is stitched to the air bag by at least one stitch, and the at least one stitch is constructed and arranged to be broken or pulled out upon deployment of the air bag beyond the threshold.

4. The air bag of claim 3 wherein the at least one stitch is constructed and arranged to withstand a force of between 10 newtons and 60 newtons.

5. The air bag of claim 4 wherein between 2 and 8 stitches are provided.

6. The air bag of claim 1 wherein the valve panel is accordion folded in its first position providing at least one pleat.

7. The air bag of claim 6 wherein the pleat is taken up when the vent valve moves to its second position to move the at least one valve opening at least partially out of registry with the at least one vent opening through the wall.

8. The air bag of claim 1 wherein the valve panel is connected to the wall on either side of at least one fold so that movement of the wall as the air bag is deployed beyond the threshold at least partially extends the valve panel to move the vent valve toward its second position.

9. The air bag of claim 1 wherein the valve panel entirely covers each of the at least one vent opening through the wall when the vent valve is in its second position.

10. The air bag of claim 1 wherein the valve panel is formed from the same material as the air bag wall.

11. An air bag, comprising:
    a wall defining an interior in which a gas is received to inflate the air bag, and at least one vent opening through the wall; and
    a vent valve having a valve panel folded onto itself and including first and second legs with a bight between them, the first and second legs each being connected to the wall and having a valve opening, the valve opening of the first leg being aligned with the at least one vent opening, the vent valve being moveable between a first position where the valve opening of the second leg is aligned with the at least one vent opening and a second position where the valve panel is extended to lengthen the second leg and shorten the first leg to at least partially misalign the valve opening of the second leg with the at least one vent opening and at least partially close the at least one vent opening, and wherein the vent valve is in its first position until deployment of the air bag beyond a threshold which moves the vent valve to its second position;
    wherein the vent valve when in its first position is folded within the interior of the air bag, and movement of the air bag when deployed beyond the threshold at least partially unfolds the valve panel to move the vent valve to its second position.

12. An air bag, comprising:
    a wall defining an interior in which a gas is received to inflate the air bag, and at least one vent opening through the wall; and
    a vent valve having a valve panel folded onto itself and including first and second legs with a bight between them, the first and second legs each being connected to the wall and having a valve opening, the valve opening of the first leg being aligned with the at least one vent opening, the vent valve being moveable between a first position where the valve opening of the second leg is aligned with the at least one vent opening and a second position where the valve panel is extended to lengthen the second leg and shorten the first leg to at least partially misalign the valve opening of the second leg with the at least one vent opening and at least partially close the at least one vent opening, and wherein the vent valve is in its first position until deployment of the air bag beyond a threshold which moves the vent valve to its second position;

wherein the vent valve when in its first position is folded within the interior of the air bag, and movement of the air bag when deployed beyond the threshold at least partially unfolds the valve panel to move the vent valve to its second position;

wherein the valve opening of the first leg remains aligned with the vent opening when the vent valve is in its second position.

* * * * *